United States Patent
Noh et al.

(10) Patent No.: US 10,740,311 B2
(45) Date of Patent: Aug. 11, 2020

(54) ASYNCHRONOUS INDEX LOADING FOR DATABASE COMPUTING SYSTEM STARTUP LATENCY MANAGMENT

(71) Applicant: SAP SE, Walldorf (DE)

(72) Inventors: Jaeyun Noh, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 539 days.

(21) Appl. No.: 14/853,569

(22) Filed: Sep. 14, 2015

(65) Prior Publication Data

US 2017/0075936 A1    Mar. 16, 2017

(51) Int. Cl.
*G06F 16/00* (2019.01)
*G06F 16/22* (2019.01)
*G06F 16/23* (2019.01)
*G06F 16/2455* (2019.01)

(52) U.S. Cl.
CPC ...... *G06F 16/2272* (2019.01); *G06F 16/2379* (2019.01); *G06F 16/2455* (2019.01)

(58) Field of Classification Search
CPC ......... G06F 17/30336; G06F 17/30578; G06F 16/2455; G06F 16/2379; G06F 16/2272
USPC ........................................ 707/696
See application file for complete search history.

(56) References Cited

U.S. PATENT DOCUMENTS

| | | | |
|---|---|---|---|
| 7,577,667 B2 * | 8/2009 | Hinshaw | G06F 16/273 |
| 2003/0093408 A1 * | 5/2003 | Brown | G06F 16/2272 |
| 2004/0098378 A1 * | 5/2004 | Kimchi | G06F 16/95 |
| 2005/0125409 A1 * | 6/2005 | Day | G06F 16/24539 |
| 2006/0069672 A1 * | 3/2006 | Maloney | G06F 16/2272 |
| 2006/0294058 A1 * | 12/2006 | Zabback | G06F 16/2462 |
| 2007/0073761 A1 * | 3/2007 | Anderson | G06F 16/217 |
| 2009/0210429 A1 * | 8/2009 | Agrawal | G06F 16/273 |
| 2010/0250504 A1 * | 9/2010 | Balasubramanian | G06F 16/217 707/696 |
| 2011/0106815 A1 * | 5/2011 | Dubs | G06F 16/13 707/747 |
| 2012/0016881 A1 * | 1/2012 | Hrle | G06F 16/22 707/746 |
| 2012/0131593 A1 * | 5/2012 | DePetro | G06F 9/5088 718/105 |
| 2013/0159248 A1 * | 6/2013 | Mueller | G06F 16/2453 707/609 |
| 2013/0173558 A1 * | 7/2013 | Whisenant | G06F 11/0793 707/674 |

(Continued)

*Primary Examiner* — Usmaan Saeed
*Assistant Examiner* — David M Nafziger
(74) *Attorney, Agent, or Firm* — Sterne, Kessler, Goldstein & Fox P.L.L.C.

(57) ABSTRACT

A system, computer-implemented method, and computer-program product embodiments for rebuilding database indexes is disclosed. A pre-loader thread rebuilds a plurality of indexes in the background once a database is initialized. Simultaneously, a query processor receives queries from a user/client of a database. If an index that is required by the query processor has not yet been rebuilt by the pre-loader, a request to rebuild the index is sent to an asynchronous index loader. The asynchronous index loader places the request in a queue, processes the queue based on available system resources, and then rebuilds the requested indexes. Once the necessary indexes have been rebuilt, a wake-up signal is sent to the query processor which then proceeds to execute the query from a user/client.

21 Claims, 7 Drawing Sheets

(56) References Cited

U.S. PATENT DOCUMENTS

| | | | |
|---|---|---|---|
| 2014/0324785 A1* | 10/2014 | Gupta | G06F 16/2358 |
| | | | 707/689 |
| 2016/0070746 A1* | 3/2016 | Bender | G06F 16/2372 |
| | | | 707/696 |
| 2016/0147751 A1* | 5/2016 | Li | G06F 16/2272 |
| | | | 707/722 |
| 2016/0378601 A1* | 12/2016 | Oukid | G06F 3/068 |
| | | | 714/3 |
| 2017/0134961 A1* | 5/2017 | Ghosh | H04L 67/1097 |
| 2017/0177669 A1* | 6/2017 | Li | G06F 16/24549 |

\* cited by examiner

ASYNCHRONOUS INDEX LOADING FOR DATABASE COMPUTING SYSTEM STARTUP LATENCY MANAGMENT

BACKGROUND

Computer databases have become a prevalent means for data storage and retrieval. Due to the lowering cost of memory as well as increasing computing speeds, databases today can be large. Large databases can make querying a database for specific information a computationally intensive process. Indexes can be employed by the database to make the querying process quicker and more efficient. However loading indexes (i.e., rebuilding them) during an initial system startup as in the case of in-memory databases can create a cumbersome latency between the time when the database is initialized and when the client is able to perform a query.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the relevant art to make and use the embodiments.

DETAILED DESCRIPTION

Provided herein are system, method and/or computer program product embodiments, and/or combinations and sub-combinations thereof, for generating cardinality estimates, where cardinality estimates are used for generating an improved or optimal query plan for a query.

Figure 1:
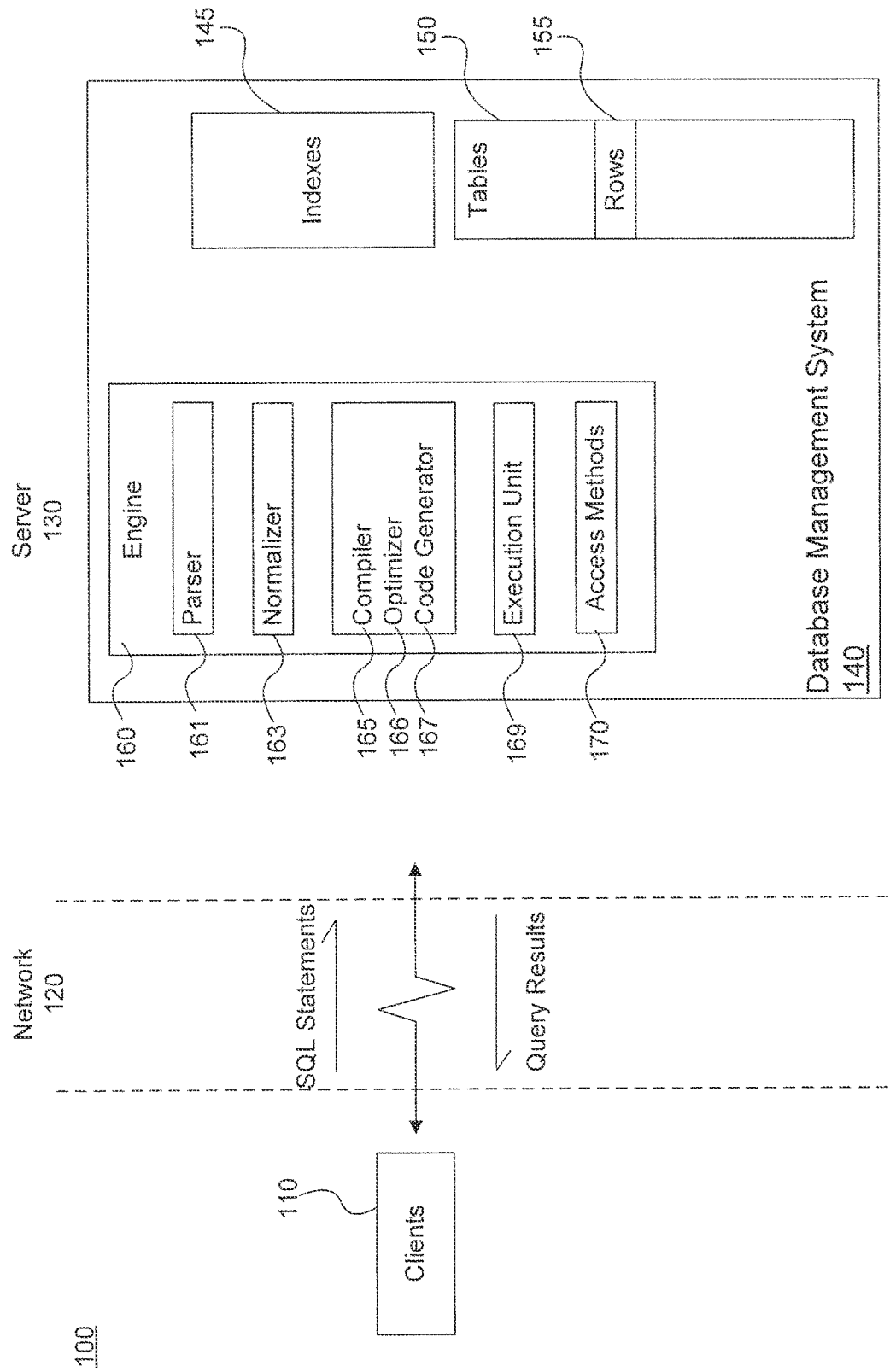
FIG. 1 illustrates an exemplary database management system (DBMS), according to examples of the disclosure.

FIG. 1 is an example database computing environment 100 in which embodiments can be implemented. Computing environment 100 includes a database management system (DBMS) 140 and client 110 that communicates DBMS 140. DBMS 140 may be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application that requires access to DBMS 140. In another embodiment, a user may operate client 110 to request access to DBMS 140. Throughout this specification, the terms client and user will be used interchangeably to refer to any hardware, software, or human requestor, such as client 110, accessing DBMS 140 either manually or automatically. Additionally, both client 110 and DBMS 140 may execute within a computer system, such as an example computer system discussed in FIG. 6.

Client 110 and DBMS 140 may communicate over network 120. Network 120 may be any network or combination of networks that can carry data communications. Such a network 120 may include, but is not limited to, a local area network, metropolitan area network, and/or wide area network that include the Internet.

DBMS 140 receives a query, such as query 102, from client 110. Query 102 is used to request, modify, append, or otherwise manipulate or access data in database storage 150. Query 102 is transmitted to DBMS 140 by client 110 using syntax that conforms to a query language. In a non-limiting embodiment, the query language is a Structured Query Language ("SQL"), but may be another query language. DBMS 140 is able to interpret query 102 in accordance with the query language and, based on the interpretation, generate requests to database storage 150.

Query 102 may be generated by a user using client 110 or by an application executing on client 110. Upon receipt, DBMS 140 begins to process query 102. Once processed, the result of the processed query is transmitted to client 110 as query result 104.

To process query 102, DBMS 140 includes a parser 162, a normalizer 164, a compiler 166, and an execution unit 168.

Parser 162 parses the received queries 102. In an embodiment, parser 162 may convert query 102 into a binary tree data structure that represents the format of query 102. In other embodiments, other types of data structures may be used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 170 to generate an access plan for executing the query.

Query optimizer 170 analyzes the query and determines a query plan for executing the query. The query plan retrieves and manipulates information in the database storage 150 in accordance with the query semantics. This may include choosing the access method for each table accessed, choosing the order in which to perform a join operation on the tables, and choosing the join method to be used in each join operation. As there may be multiple strategies for executing a given query using combinations of these operations, query optimizer 170 generates and evaluates a number of strategies from which to select the best strategy to execute the query.

In an embodiment, query optimizer 170 generates multiple query plans. Once generated, query optimizer 170 selects a query plan from the multiple query plans to execute the query. The selected query plan may be a cost efficient plan, a query plan that uses the least amount of memory in DBMS 140, a query plan that executes the quickest, or any combination of the above, to give a few examples.

In an embodiment, in order for query optimizer 170 to generate and select a query plan; DBMS 140 uses a data statistic object generator 172 to estimate the computational cost of a particular query plan. Data statistic object generator 172 can provide an estimate of the size (i.e., number of rows) of a query plan before the query plan is executed. Based on the estimate, query optimizer 170 selects an efficient query plan that executes query 102 from multiple query plans.

As part of its function, query optimizer 170 can also generate indexes to ensure that that information from the database can be retrieved quickly and efficiently. An index is a sorted copy of selected database table fields that can allow for a query to retrieve information quickly and without having to scan the entire database to retrieve a selection of information.

As illustrated in FIG. 1, query optimizer 170 can generate indexes 145. To illustrate the concept and functionality of an index, a sample database is provided below:

| Memory Location | Name | Age | Gender |
| --- | --- | --- | --- |
| 0001 | John | 23 | M |
| 0010 | Jane | 12 | F |
| 0011 | Sam | 16 | M |
| 0100 | Suzy | 76 | F |

The above example is a simplified database that is being utilized for illustration, and is not being used to limit the type of databases discussed in examples of the disclosure. If a query wanted to identify all entries that were female, the requested information could be delivered by scanning each and every row of the database, and identifying those rows in which the gender of the person is female. In the above database, this would be a simple operation as there are only a few rows, however in a database that held thousands or millions of entries, scanning the entire database could be a computationally expensive and slow task.

To simplify the above search, the query optimizer 170 can choose an index 145 that is based on gender. An example index is illustrated below:

| Gender | Memory Pointer |
| --- | --- |
| F | 0010 |
| F | 0100 |
| M | 0001 |
| M | 0011 |

The above index includes two pieces of information. First in includes all of the genders that appear in the database, and second the accompanying pointer to the location in memory where the gender appears in the database. In this way, when a query is generated that seeks to find all females in the database, the index can provide that information without requiring that the entire database be scanned row-by-row.

The query optimizer 170 can select the indexes 145 based on prior query history of the database or based on database client inputs that select the types of indexes that are desired by the user.

In some examples, indexes 145 are not persistently stored (i.e., they are stored in volatile memory). Since indexes are not persistently stored, each and every index must be built and loaded into memory at startup time. Although the rebuilding process fully utilizes all the available processing power to rebuild the indexes, the elapsed time depends on the size of the database and the number of indexes that need to be rebuilt.

Figure 2:
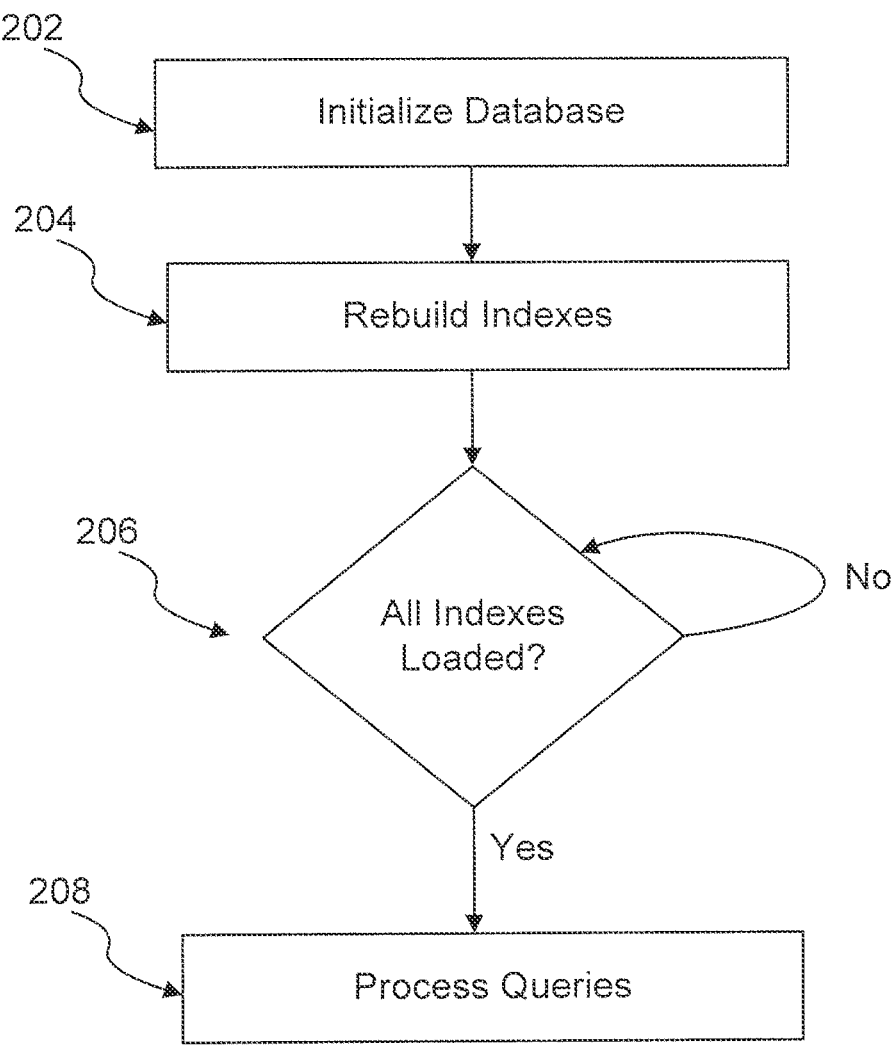
FIG. 2 is a flowchart illustrating an exemplary initialization process of a database according to examples of the disclosure.

FIG. 2 is a flowchart illustrating an exemplary initialization process of a database according to examples of the disclosure. As step 202, the database is initialized. In some examples this can be mean that the computer in which the database is stored is turned on. In other examples, initializing the database can be done via software in which the user initializes the software that then proceeds to initialize the database.

At step 204 the indexes are rebuilt as described above with respect to the discussion of FIG. 1. At step 206, the in-memory DBMS can check to see if all of the indexes that existed during the last operation of the database have been rebuilt. If all of the indexes have failed to rebuild, the process can wait at step 206 until all of the indexes have been rebuilt. Once all of the indexes have been rebuilt, the process can move to step 208 wherein the database is ready to begin processing queries generated by a client/user as discussed above with respect to FIG. 1.

The amount of time spent at step 206 is proportional to the number and size of the indexes that have to be rebuilt upon startup. In other words the more indexes that are required to be rebuilt at startup and the size of the indexes to be rebuilt can lengthen the amount of time that the initialization process outlined in FIG. 2 takes. The elapsed time to rebuild all of the indexes can be described as a startup latency that slows down the startup time (i.e., the time between when the database is initially activated to when the database is ready to begin processing queries). The startup latency can take several minutes and can frustrate the database user's experience. Thus the index rebuilding process can be one area in which the startup latency of a database management system can be improved.

Figure 3:
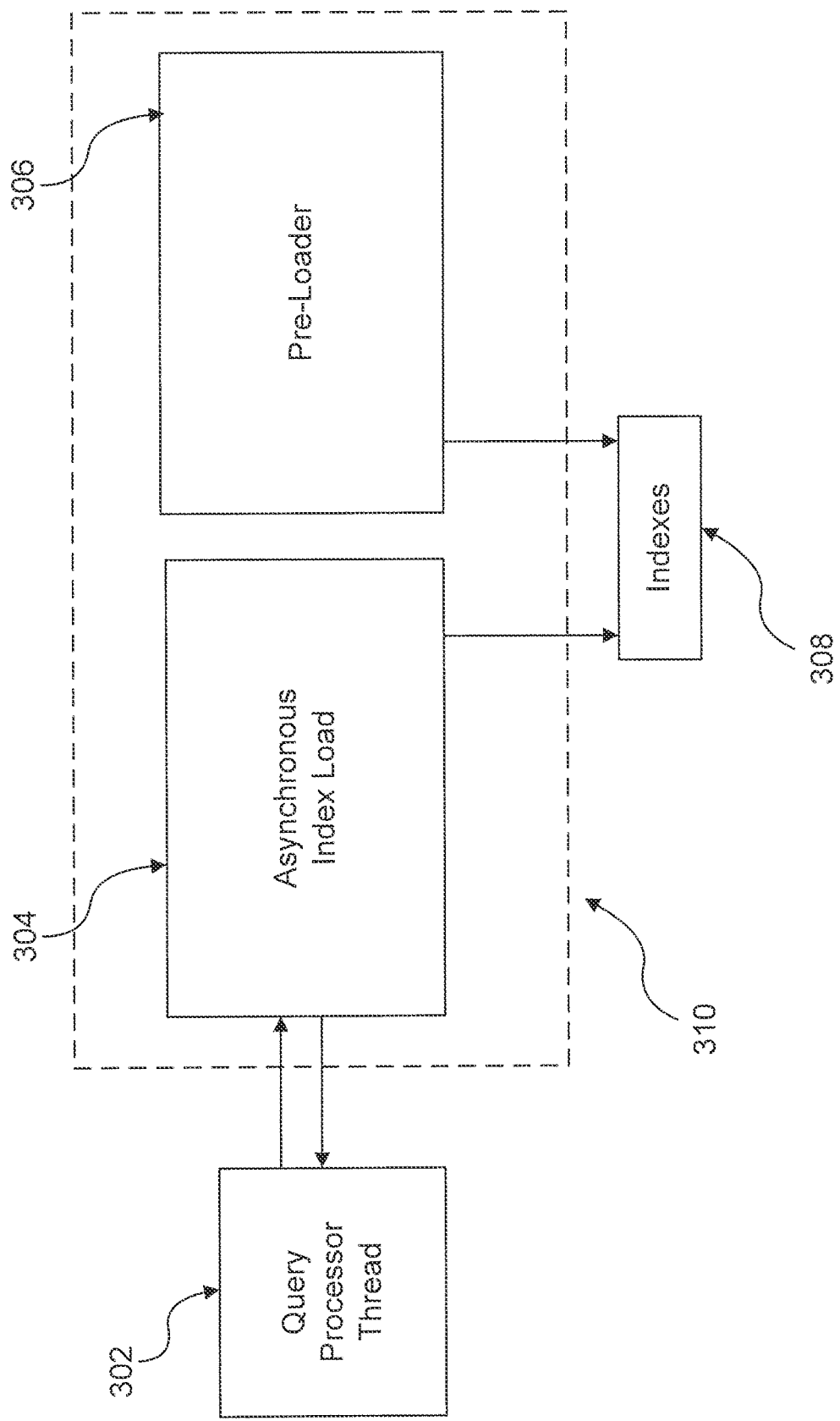
FIG. 3 illustrates an exemplary asynchronous index loading system according to examples of the disclosure.

FIG. 3 illustrates an exemplary asynchronous index loading system according to examples of the disclosure. Rather than wait for all of the indexes to be rebuilt as discussed with respect to FIG. 2, the database management system of FIG. 3 provides two methods by which an index can be rebuilt: a pre-loader thread 306 and an asynchronous index loader 304.

The pre-loader thread (discussed in further detail below with respect to FIG. 4) upon database initialization can rebuild the indexes 308 from the query optimizer 170 in the background. In other words rather than waiting for all the indexes of the database management system to be rebuilt, the pre-loader thread can rebuild the indexes 308 in parallel with the user/client performing queries on the database management system.

Query processor thread 302 (discussed in further detail below with respect to FIG. 5) can field queries from the user/client in parallel with the pre-loader rebuilding the indexes 308. In the event that a query being processed by the query processor thread 302 requires an index that has not yet been rebuilt by the pre-loader thread 306, the query processor thread can interface with an asynchronous index loader 304 (discussed in further detail below with respect to FIG. 6) that can rebuild the needed index "on the fly" or in other words can rebuild the needed index at the time that it is needed by the query processor thread.

In this example, rather than having to wait until all of the indexes are rebuilt before fielding a query to the database, the database management system can field queries nearly immediately after the database has been initialized. This allows for the latency experienced by the client/user to be minimized with respect to a database management system in which all of the indexes must be rebuilt prior to query execution.

Figure 4:
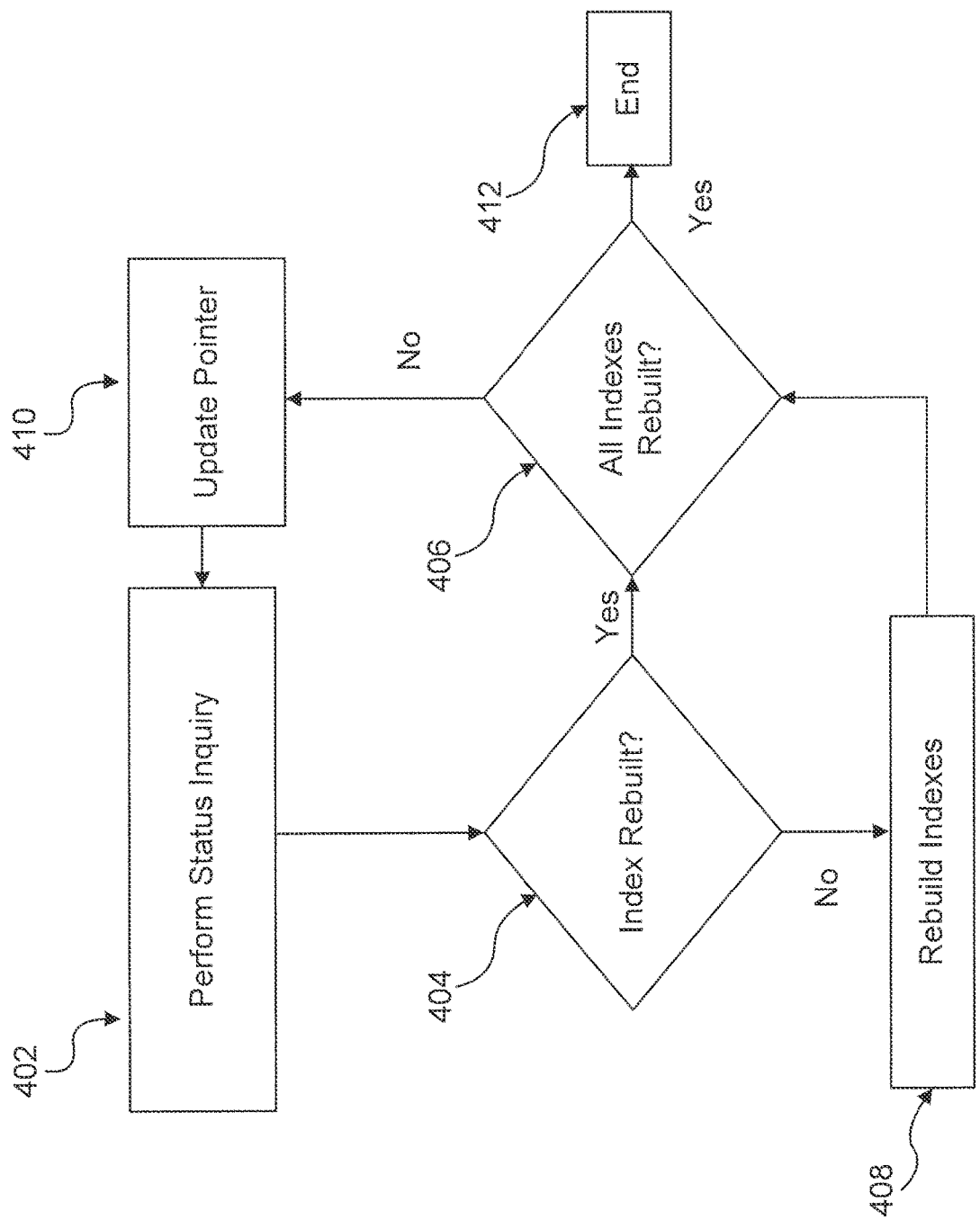
FIG. 4 is a flowchart illustrating an exemplary index preloading process of a database management system according to examples of the disclosure.

FIG. 4 is a flowchart illustrating an exemplary index preloading process of a database management system according to examples of the disclosure. As discussed above with respect to FIG. 3, the pre-loader process can operate in parallel with processing of queries generated by a client/user of a particular database.

At step 402, the pre-loader thread can perform a status inquiry. The status inquiry can be performed via the use of an index pointer table, in which all of the indexes that are to be rebuilt can be listed along with a pointer to the location in memory where the index is or will be stored. The pre-loader thread can access the pointer table that can also contain information as to the status of the index (i.e., whether or not the index has been rebuilt).

At step 404, a determination can be made as to whether the index at a particular entry of the index pointer table has been rebuilt. If it is determined that the index has not been rebuilt, the process can move to step 408 wherein the index corresponding to the entry on the index pointer table is rebuilt. Once the index corresponding to the entry has been rebuilt, the process can move to step 406 wherein the pre-loader thread can determine whether there are more entries of the index pointer table that need to be analyzed.

If the index at the particular entry of the index pointer is determined to have been already rebuilt at step 404, the process can move directly to step 406 wherein the pre-loader thread can determine whether there are more entries of the index pointer table that need to be analyzed.

If it is determined that all of the indexes have been rebuilt, the process can move to step 412 wherein the pre-loading process is terminated. If on the other hand, it is determined that there are more indexes in need of rebuilding, the process can move to step 410 wherein the entry of the index pointer table that is being analyzed is updated to move to the next entry on the list and the process can then be repeated for the new entry of the index pointer table.

Figure 5:
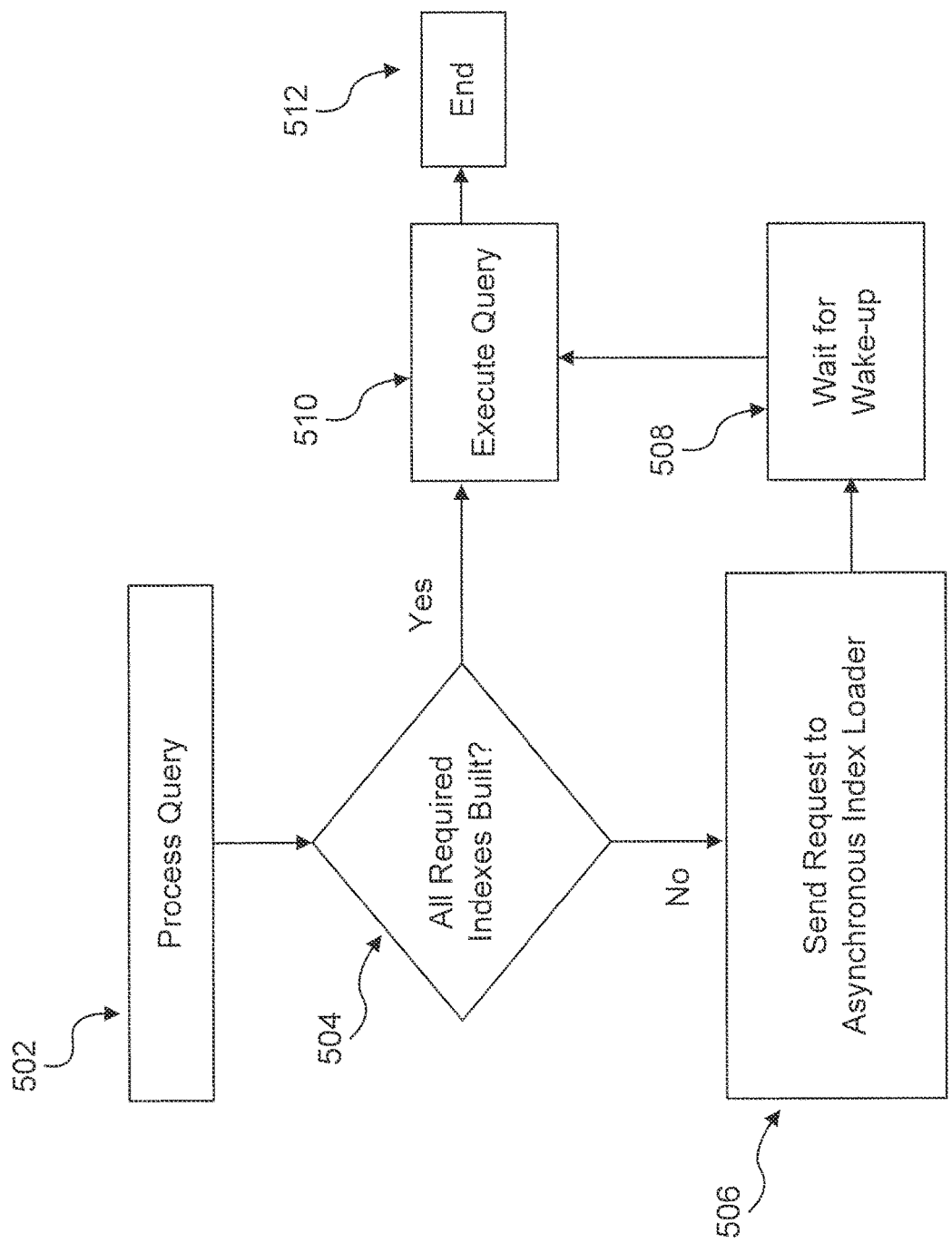
FIG. 5 is a flowchart illustrating an exemplary query processing routine of a database management system according to examples of the disclosure.

While the pre-loader thread is operating in the background, the query processor thread can also operate in parallel. FIG. 5 is a flowchart illustrating an exemplary query processing routine of a database management system according to examples of the disclosure. At step 502 a query generated by a client/user of the database is processed. As part of the processing, the database management system in conjunction with the query optimizer 166 discussed above with respect to FIG. 1 determines whether the necessary indexes required to execute the query have been rebuilt at step 504. If the necessary indexes have been rebuilt, the process can move to step 510 wherein the query is executed and the process is then terminated at step 512.

If however, the necessary indexes have not yet been rebuilt, a request can be transmitted to the asynchronous loader (discussed below) to build the necessary indexes. At step 508 the outstanding query can wait until the asynchronous index loader indicating that all of the necessary indexes have been rebuilt sends a wake-up signal.

Once the necessary indexes have been rebuilt and the wake up signal has been received, the process can move to step 510 wherein the query is executed. Finally, the process moves to step 510 wherein the query processing is terminated upon completion.

Figure 6:
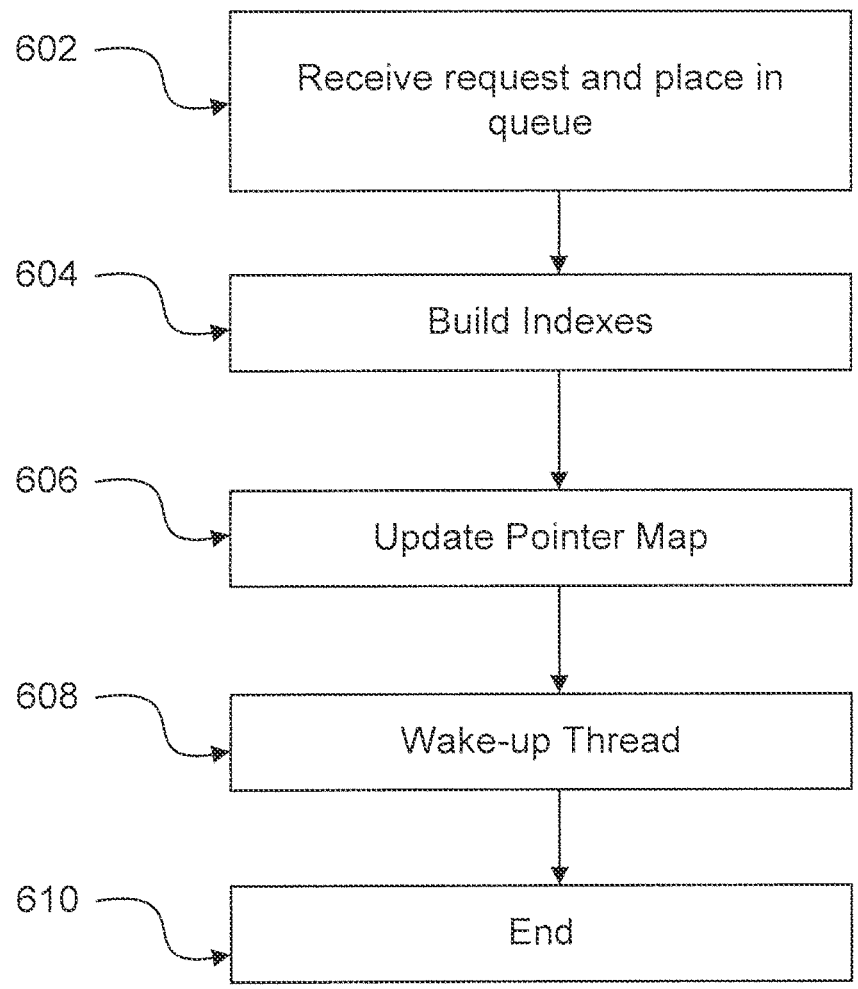
FIG. 6 is a flowchart illustrating an exemplary asynchronous index loading process of a database management system according to examples of the disclosure.

FIG. 6 is a flowchart illustrating an exemplary asynchronous index loading process of a database management system according to examples of the disclosure. As discussed above, the process illustrated in FIG. 6 can operate in parallel with the pre-loader process discussed above with respect to FIG. 4.

At step 602, the asynchronous loader process can receive a request to rebuild an index from the query execution process discussed above with respect to FIG. 5. Once the request is received, the request can be placed in a queue with other requests that have been sent by the query execution process.

At step 604, the requested indexes can be rebuilt. In one example, the database management system can take into account the system memory utilization and available system processing resources to determine the order in which the outstanding indexes are to be rebuilt. During times in which the system resources are scarce, indexes that are smaller or less complex and be rebuilt before larger more complex indexes are built.

Once the requests have been fulfilled and the requested indexes have been rebuilt, the process can move to step 606 wherein the index pointer table (discussed above with respect to FIG. 4) can be updated so that the status of the entries corresponding to the rebuilt indexes can be updated to reflect that they have been rebuilt.

At step 608, once all the necessary indexes corresponding to the request generated by a query execution process have been rebuilt a wake up signal can be generated and sent to the query execution process to continue executing the query. Upon generation of the wake up signal, the process can end at step 610.

Figure 7:
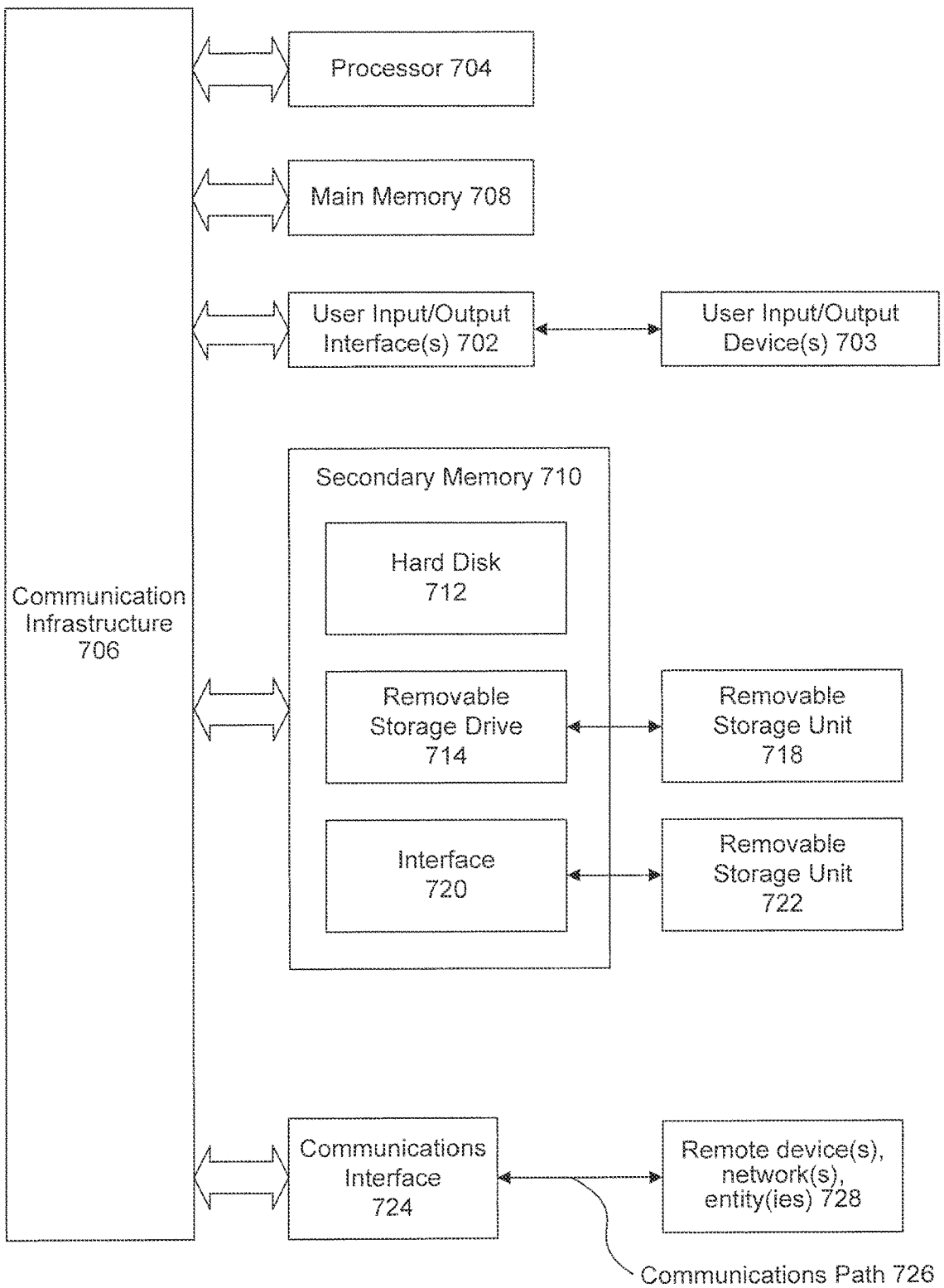
FIG. 7 is a block diagram of an example computer system in which examples of the disclosure may be implemented.

FIG. 7 is a block diagram of an example computer system in which embodiments may be implemented. Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 1308 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the embodiments or the appended claims in any way.

While the embodiments have been described herein with reference to exemplary embodiments for exemplary fields and applications, it should be understood that the embodiments are not limited thereto. Other embodiments and modifications thereto are possible, and are within the scope and spirit of the embodiments. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the embodiments should not be limited by any of the above-described exemplary embodiments, but should be defined only in accordance with the following claims and their equivalents.

What is claimed is:

1. A computer-implemented method comprising:

building, by a pre-loader thread, a plurality of indexes in a database management system during an initialization process;

receiving a query during the initialization process;

generating a plurality of query plans for executing the query by determining a plurality of tables accessed by the query and choosing an access method for the plurality of tables, an order in which to perform join operations on the plurality of tables, and a method for performing the join operations;

selecting a query plan from the plurality of query plans based on a size estimate of the query plan, wherein the query plan generates a required index from the plurality of indexes;

performing a status inquiry by accessing an index pointer table that lists the plurality of indexes and one or more status entries to determine if the required index has been rebuilt by the pre-loader thread;

based on a determination that the required index has not been yet been rebuilt by the pre-loader thread:

generating a request to build the required index;

sending the request to an asynchronous loader;

placing the request into a request queue, wherein outstanding requests in the request queue are ordered based on available system resources;

building, by the asynchronous loader, the required index;

updating the index pointer table to reflect the building of the required index;

sending, by the asynchronous loader, a wake up signal to the query processor; and executing the query plan once the wake up signal has been received to determine a result for the query.

2. The computer-implemented method of claim 1, further comprising:
    selecting, by the pre-loader thread, a particular index from the plurality of indexes to rebuild;
    determining whether the particular index has been rebuilt; and
    rebuilding the particular index if the particular index has not been rebuilt.

3. The computer-implemented method of claim 1, further comprising:
    executing, by the query processor, the query if it is determined that the required index has already been rebuilt.

4. The computer-implemented method of claim 1, wherein the index pointer table includes a plurality of memory pointers indicating locations in memory of the plurality of indexes.

5. A system for rebuilding a plurality of indexes in a database management system during an initialization process, comprising:
    a memory; and
    at least one processor coupled to the memory and configured to:
        receive a query during the initialization process;
        generate a plurality of query plans for executing the query by determining a plurality of tables accessed by the query and choosing an access method for the plurality of tables, an order in which to perform join operations on the plurality of tables, and a method for performing the join operations;
        select a query plan from the plurality of query plans based on a size estimate of the query plan, wherein the query plan generates a required index;
        perform a status inquiry by accessing an index pointer table that lists the plurality of indexes and one or more status entries to determine if the required index has been rebuilt by the pre-loader thread;
        if it is determined that the required index has not yet been rebuilt by the pre-loader thread:
            generate a request to build the required index if it is determined that the required index has not yet been rebuilt;
            send the request to an asynchronous loader; and
            when a wake up signal is received, execute the query plan to determine a result for the query,
        wherein the asynchronous loader is configured to:
            place the request into a request queue, wherein outstanding requests indexes in the request queue are ordered based on available system resources;
            build the required index;
            update the index pointer table to reflect the building of the required index; and
            send the wake up signal to the query processor.

6. The system of claim 5, the at least one processor further configured to:
    select a particular index from the plurality of indexes to rebuild;
    determine whether the particular index has been rebuilt; and
    rebuild the particular index if it determined that the particular index has not been rebuilt.

7. The system of claim 5, the at least one processor further configured to:
    execute the query if it is determined that the required index has already been rebuilt.

8. The system of claim 5, wherein the index pointer table includes a plurality of memory pointers indicating locations in memory of the plurality of indexes.

9. A non-transitory computer-readable device having instructions stored thereon that, when executed by at least one computing device, causes the at least one computing device to perform operations comprising:
    building, by a pre-loader thread, a plurality of indexes in a database management system during an initialization process;
    receiving, by a query processor, a query during the initialization process;
    generating, by the query processor, a plurality of query plans for executing the query by determining a plurality of tables accessed by the query and choosing an access method for the plurality of tables, an order in which to perform join operations on the plurality of tables, and a method for performing the join operations;
    selecting, by the query processor, a query plan from the plurality of query plans based on a size estimate of the query plan, wherein the query plan generates a required index;
    performing, by the query processor, a status inquiry by accessing an index pointer table that lists the plurality of indexes and one or more status entries to determine if the required index has been rebuilt by the pre-loader thread;
    if it is determined that the required index has not been yet been rebuilt by the pre-loader thread:
        generating, by the query processor, a request to build the required index;
        sending, by the query processor, the request to an asynchronous loader;
        placing, by the asynchronous loader, the request into a request queue, wherein outstanding requests in the request queue are ordered based on available system resources;
        building, by the asynchronous loader, the required index;
        updating, by the asynchronous loader, the index pointer table to reflect the building of the required index;
        sending, by the asynchronous loader, a wake up signal to the query processor, and
        executing, by the query processor, the query plan once the wake up signal has been received to determine a result for the query.

10. The non-transitory computer-readable device of claim 9, the operations further comprising:
    selecting a particular index from the plurality of indexes to rebuild;
    determining whether the particular index has been rebuilt; and
    rebuilding the particular index if it determined that the index has not been rebuilt.

11. The non-transitory computer-readable device of claim 9, the operations further comprising:
    executing the query if it is determined that the required index has already been rebuilt.

12. The non-transitory computer-readable device of claim 9, wherein the index pointer table includes a plurality of memory pointers indicating locations in memory of the plurality of indexes.

13. The computer-implemented method of claim 1, wherein the initialization process begins when a computer running the database management system is turned on.

14. The system of claim 5, wherein the initialization process begins when a computer running the database management system is turned on.

15. The tangible computer-readable device of claim 9, wherein the initialization process begins when the at least one computing device is turned on.

16. The computer-implemented method of claim 1, further comprising:
   determining that the available system resources are scarce; and
   ordering the request queue by size, wherein a first request to build a first index is processed before a second request to build a second index when the first index is smaller than the second index.

17. The system of claim 5, the at least one processor further configured to:
   determine that the available system resources are scarce; and
   order the request queue by size of, wherein a first request to build a first index is processed before a second request to build a second index when the first index is smaller than the second index.

18. The tangible computer-readable device of claim 9, the operations further comprising:
   determining that the available system resources are scarce; and
   ordering the request queue by size, wherein a first request to build a first index is processed before a second request to build a second index when the first index is smaller than the second index.

19. The computer-implemented method of claim 1, wherein the database management system is an in-memory database system.

20. The system of claim 5, wherein the database management system is an in-memory database system.

21. The non-transitory computer-readable device of claim 9, wherein the database management system is an in-memory database system.

* * * * *